(12) United States Patent
Kato

(10) Patent No.: US 9,297,479 B2
(45) Date of Patent: Mar. 29, 2016

(54) PIPE MOUNTING UNIT WITH GROUNDING FUNCTION

(71) Applicant: NEWFREY LLC, Newark, DE (US)

(72) Inventor: Hiroyuki Kato, Tochigi (JP)

(73) Assignee: NEWFREY LLC, New Britain, CT (US)

( * ) Notice: Subject to any disclaimer, the term of this patent is extended or adjusted under 35 U.S.C. 154(b) by 3 days.

(21) Appl. No.: 14/275,097

(22) Filed: May 12, 2014

(65) Prior Publication Data

US 2014/0299723 A1    Oct. 9, 2014

Related U.S. Application Data

(63) Continuation of application No. PCT/JP2012/079612, filed on Nov. 15, 2012.

(30) Foreign Application Priority Data

Nov. 18, 2011 (JP) ................................. 2011-252545

(51) Int. Cl.
| | |
|---|---|
| *F16L 3/12* | (2006.01) |
| *F16L 3/10* | (2006.01) |
| *F16B 37/00* | (2006.01) |
| *F16L 3/223* | (2006.01) |
| *F16L 55/035* | (2006.01) |
| *F16M 13/02* | (2006.01) |

(Continued)

(52) U.S. Cl.
CPC ................. *F16L 3/12* (2013.01); *F16B 37/002* (2013.01); *F16L 3/1075* (2013.01); *F16L 3/1222* (2013.01); *F16L 3/2235* (2013.01); *F16L 25/01* (2013.01); *F16L 55/035* (2013.01); *F16M 13/02* (2013.01); *H01R 4/64* (2013.01); *F16B 37/0842* (2013.01); *F16B 2001/0064* (2013.01)

(58) Field of Classification Search
CPC ......... F16L 3/12; F16L 3/1222; F16L 3/1075; F16B 37/002
USPC ........................................................ 248/68.1
See application file for complete search history.

(56) References Cited

U.S. PATENT DOCUMENTS

| | | | | |
|---|---|---|---|---|
| 2,355,742 | A | * | 8/1944 | Morehouse ................... 248/68.1 |
| 2,704,676 | A | * | 3/1955 | Harding ......................... 285/220 |

(Continued)

FOREIGN PATENT DOCUMENTS

| | | | |
|---|---|---|---|
| EP | 0962665 A1 | * | 12/1999 |
| EP | 2141397 A |   | 1/2010 |

(Continued)

*Primary Examiner* — Terrell McKinnon
*Assistant Examiner* — Eret McNichols
(74) *Attorney, Agent, or Firm* — Michael P. Leary

(57) ABSTRACT

A pipe mounting unit with grounding function, which includes a pipe holding section and a body fixing section, is formed by superposing a lid to a conductive plastic housing, between which there is disposed a conductive rubber clamp that holds a pipe in contact. In the space of the fixing section; a metal clip hooks together with a stud bolt on the housing; the metal clip has a current conducting plate that presses on the threading of the stud bolt, and the tip of the current conducting plate forming an angle to a radial direction of, and contacting the stud bolt, and is arranged such that its length extends beyond the threading of the stud bolt in an axial direction of the stud bolt. A conductive path is formed among the conductive rubber clamp, the conductive plastic housing and the current conducting plate of the metal clip.

10 Claims, 15 Drawing Sheets

(51) Int. Cl.
*H01R 4/64* (2006.01)
*F16L 25/01* (2006.01)
*F16B 37/08* (2006.01)
*F16B 1/00* (2006.01)

(56) References Cited

U.S. PATENT DOCUMENTS

| | | | | |
|---|---|---|---|---|
| 3,395,602 | A * | 8/1968 | Strange | 411/437 |
| 4,467,988 | A * | 8/1984 | Kraus | 248/68.1 |
| 4,728,236 | A * | 3/1988 | Kraus | 411/437 |
| 5,257,768 | A * | 11/1993 | Juenemann et al. | 248/604 |
| 5,384,936 | A * | 1/1995 | Van Walraven | 24/279 |
| 5,423,647 | A * | 6/1995 | Suzuki | 411/433 |
| 5,568,906 | A * | 10/1996 | Hahn et al. | 248/74.1 |
| 5,816,762 | A * | 10/1998 | Miura et al. | 411/433 |
| 5,947,426 | A * | 9/1999 | Kraus | 248/74.2 |
| 6,070,836 | A * | 6/2000 | Battie et al. | 248/68.1 |
| 6,152,406 | A * | 11/2000 | Denndou | 248/68.1 |
| 6,206,330 | B1 * | 3/2001 | Oi et al. | 248/68.1 |
| 6,386,927 | B2 * | 5/2002 | Nakayama et al. | 439/801 |
| 6,708,931 | B2 * | 3/2004 | Miura | 248/68.1 |
| 6,915,990 | B2 * | 7/2005 | Maruyama | 248/68.1 |
| 7,008,160 | B2 * | 3/2006 | Kanie | 411/433 |
| 7,036,775 | B2 * | 5/2006 | Nakanishi | 248/68.1 |
| 7,066,701 | B2 * | 6/2006 | Kovac | 411/433 |
| 7,172,162 | B2 * | 2/2007 | Mizukoshi et al. | 248/68.1 |
| 7,316,374 | B2 * | 1/2008 | Maruyama | 248/68.1 |
| 7,320,571 | B2 * | 1/2008 | Kanie | 411/433 |
| 7,322,784 | B2 * | 1/2008 | Castro et al. | 411/433 |
| 7,530,536 | B2 * | 5/2009 | Hashimoto | 248/68.1 |
| 7,614,589 | B2 * | 11/2009 | Kato | 248/55 |
| 7,651,057 | B2 * | 1/2010 | Sedivy et al. | 248/68.1 |
| 7,770,850 | B2 * | 8/2010 | Allmann et al. | 248/68.1 |
| 8,684,321 | B2 * | 4/2014 | Shirakabe et al. | 248/74.1 |
| 8,914,952 | B2 * | 12/2014 | Wakabayashi | 24/457 |
| 8,919,717 | B2 * | 12/2014 | Hauser | 248/309.1 |
| 8,959,730 | B2 * | 2/2015 | Hemingway et al. | 24/453 |
| 8,967,556 | B2 * | 3/2015 | Meyers et al. | 248/74.1 |
| 8,979,461 | B2 * | 3/2015 | Pearson et al. | 411/511 |
| 2001/0019091 | A1 * | 9/2001 | Nakanishi | 248/68.1 |
| 2005/0008456 | A1 * | 1/2005 | Birkelbach et al. | 411/526 |
| 2005/0116122 | A1 * | 6/2005 | Nakanishi | 248/68.1 |
| 2006/0024994 | A1 * | 2/2006 | Kato | 439/92 |
| 2006/0099049 | A1 * | 5/2006 | Peterson | 411/433 |
| 2007/0248436 | A1 * | 10/2007 | Sano | 411/175 |
| 2007/0284485 | A1 * | 12/2007 | Kato | 248/68.1 |
| 2009/0028668 | A1 * | 1/2009 | Luk | 411/511 |
| 2009/0166489 | A1 * | 7/2009 | Volchko | 248/205.1 |
| 2010/0025272 | A1 * | 2/2010 | Stau et al. | 206/349 |
| 2010/0207001 | A1 * | 8/2010 | Smith et al. | 248/230.4 |
| 2012/0014764 | A1 * | 1/2012 | Davidson et al. | 411/411 |
| 2012/0153095 | A1 * | 6/2012 | Child et al. | 248/68.1 |
| 2013/0146720 | A1 * | 6/2013 | Meyers et al. | 248/68.1 |
| 2014/0374544 | A1 | 12/2014 | Pearson et al. | |
| 2015/0159780 | A1 * | 6/2015 | Kato et al. | 174/156 |
| 2015/0308483 | A1 * | 10/2015 | Suzuki et al. | 411/366.3 |

FOREIGN PATENT DOCUMENTS

| | | | | |
|---|---|---|---|---|
| EP | 2141397 | A1 * | 1/2010 | F16L 3/10 |
| JP | 01269784 | A | 10/1989 | |
| JP | 5351568 | B | 9/2010 | |
| JP | 2010190423 | A | 9/2010 | |
| WO | 2013070858 | A | 5/2013 | |
| WO | WO 2013070858 | A1 * | 5/2013 | |

* cited by examiner

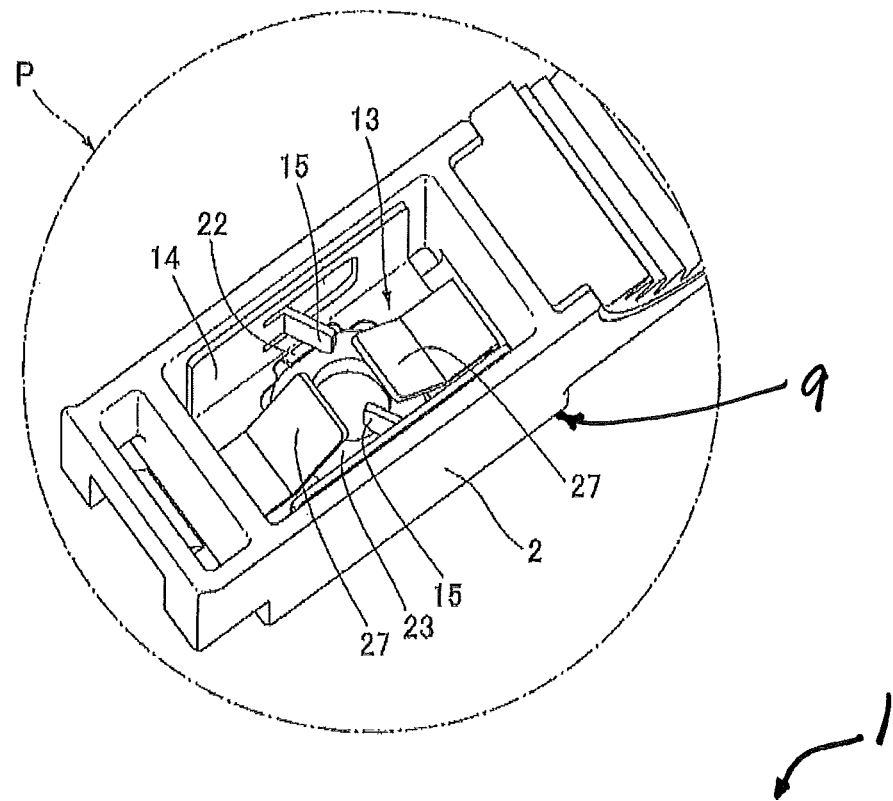
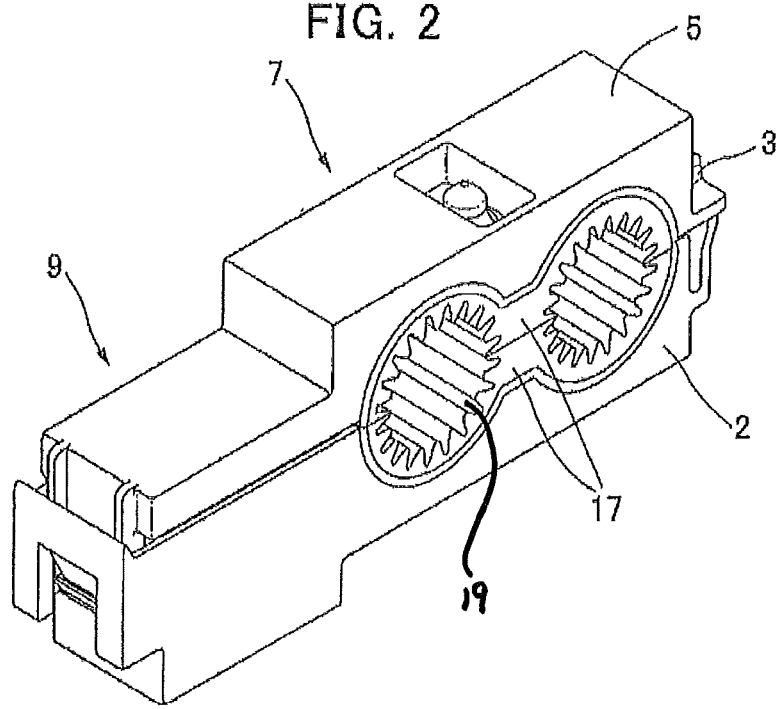

PIPE MOUNTING UNIT WITH GROUNDING FUNCTION

CROSS-REFERENCE TO RELATED APPLICATIONS

This application is a continuation of PCT Application No. PCT/JP2012/79612, filed Nov. 15, 2012 which claims priority of Japanese Patent Application No. 2011-252545, filed on Nov. 18, 2011, the disclosure of which is incorporated herein by reference.

BACKGROUND OF THE INVENTION

The present invention relates to a pipe mounting unit with grounding function, particularly a pipe mounting unit for mounting pipes such as fuel pipes to the body of an automobile or other vehicle and that is provided with a grounding function to let static electricity escape to the vehicle body.

In the prior art, a pipe mounting unit with grounding function is constructed with an externally-applied metal stay wound around a conductive rubber clamp that holds the pipe in contact with the interior ((only the rubber (or plastic) clamp is shown in Patent Reference 2)); this metal stay is fixed to a stud bolt welded to the vehicle body using a nut with a peel-off coating. In this construction, when the nut is screwed into the stud bolt, the externally-applied metal stay tightens as the nut peels off the rust free coating of the stud bolt. In this way, a conductive path is formed for the escape of static electricity between the pipe and the vehicle body. Also, conversely, the construction can have the nut welded to the vehicle body and the external metal stay fixed to this nut using a bolt with a peel-off coating.

Also, in Patent Reference 1, a construction is described in which a conductive support element supporting the fuel pipe is fixed directly to the bolt without using a stay as in the above. In this construction, a box nut is used as a nut with a peel-off coating.

Also, in Patent Reference 2, a construction is described in which, by overlapping a first part and a second part connecting the above-mentioned conductive rubber clamp by a hinge, the second part is fixed to the vehicle body panel. In this construction, by hooking a flexible hooking finger provided on the second part into a shank (for example, the axial part of a stud bolt) of a fastener fixed to the vehicle body panel, the conductive rubber clamp is fixed to the vehicle body panel and in this way, a conductive path is formed by which the static electricity between the pipe held in contact by the conductive rubber clamp, and the vehicle body panel escapes.

Furthermore, in Patent Reference 3, a pipe mounting unit is described provided with a clamp that holds the pipe body, a bolt insertion hole for inserting a bolt that protrudes from the body panel, and a stopping nut provided singly in a temporary fit to the one end aperture of this bolt insertion hole. In this pipe mounting unit, a clip is constructed for possible assembly which provides a latching claw for temporarily stopping the bolt in the other end aperture of the bolt insertion hole.

PRIOR ART REFERENCES

Patent Reference 1: Unexamined Patent Publication [Kokai] 2010-214993.
Patent Reference 2: Unexamined Patent Publication [Kokai] 2010 190423.
Patent Reference 3: Unexamined Patent Publication [Kokai] H1-269784.

According to the above-mentioned prior art, a metal stay is necessary for fixing the conductive rubber clamp to the vehicle body; it is not only costly, the surface area to peel off the coating is large, and it is susceptible to rust because the part outside of the contact part also has coating to peel off. Furthermore, a tool such as an impact wrench is necessary when tightening, so manufacturing efficiency is poor.

According to Patent Reference 1, increased cost can be avoided compared to the above-mentioned prior art, since a metal stay is not used. Also, since a box nut is used, rust resistance is ensured. However, in tightening up the box nut, a tool such as a wrench is necessary, so manufacturing efficiency is poor.

Similarly, according to Patent Reference 2, together with the avoidance of a cost increase since a metal stay is not used, rust resistance is ensured since the shank of the fastener is arranged inside the cavity receiving the fastener. However, since the hooking of the flexible hooking finger and the shank of the fastener occurs by hooking a hooking tooth furnished on the flexible hooking finger with a male screw furnished on the shank of the fastener, actual conductivity to the fastener applied with rustproof coating cannot be guaranteed.

Also, according to Patent Reference 3, the pipe holding unit can be mounted simply on a bolt via a clamp, but this pipe holding unit does not have a grounding function.

In solving the above-mentioned problems of prior art, an object of the present invention is to offer a pipe mounting unit with grounding function and its manufacturing method that reliably achieves high rust resistance and grounding function by rendering the area that the rustproof coating peels off small and that can be mounted simply with one-touch insertion without the necessity of a tool.

SUMMARY OF THE INVENTION

The present invention provides for a pipe mounting unit with grounding function furnished with a pipe holding element that holds the pipe, and a metal clip that fixes the pipe holding element to a stud bolt fixed to the vehicle body; said metal clip has a current conducting plate pressed on the threading part of the stud bolt to thereby achieve a direct metal-to-metal connection. As noted above, this is a superior electrical connection compared to the plastic-to-metal connection of Patent Reference 2, in that a plastic-to-metal connection with a coated stud bolt cannot be guaranteed. On the other hand, said current conducting plate of the present invention, forming an angle at its leading end with respect to a radial direction of the stud bolt, is arranged so that it peels off any coating that may be on the stud bolt, and extends beyond the threading of the stud bolt in an axial direction of the stud bolt while contacting the surface of the stud bolt; said pipe holding unit is made of a conductive material by which a conductive path is thus formed between said pipe holding unit and the current conducting plate of said metal clip.

One embodiment of the present invention is constructed such that said metal clip includes a U-shaped metal plate having a bottom and a pair of sides, the current conducting plate of said metal clip is made of a first segment formed by one element of said pair of sides of said metal clip, and in said bottom of said metal clip there is an aperture for insertion of a stud bolt; the ends of said pair of first segments extend inward to contact each other and press on the threading of the stud bolt that protrudes from said aperture.

Another embodiment of the present invention, furthermore, is constructed such that it is provided with a housing and a lid that is connected by a hinge to one edge of the housing, by the superposition of said housing and said lid, with said hinge as a fulcrum. Said pipe holding unit is constructed by forming a fixing element that fixes said pipe holding unit to the vehicle body; in the interior of said fixing element, a space is formed to receive the threading of said stud bolt, and in said space, said metal clip is fitted in to hook with the stud bolt.

Another embodiment of the present invention is constructed such that said metal clip has a first fixing claw for fixing the metal clip to the housing, said housing has a metal clip hooking element and said metal clip is fitted into said housing by said first fixing claw hooking with said metal clip hooking element.

Another embodiment of the present invention is constructed such that the metal clip hooking element of said housing is a protuberance formed on the bottom surface of said housing forming a space of the fixing element; said protuberance has a stud bolt insertion hole into which the stud bolt is inserted. Said first fixing claw is provided with an edge element of said aperture, and said protuberance hooks with the first fixing claw by insertion of said protuberance in said aperture.

Another embodiment of the present invention has respective conductive rubber clamps on both sides of the superposition of said housing and said lid and, on the opposite side of the respective conductive rubber clamps, is equipped with a contact concave element holding a pipe when they are superposed.

Another embodiment of the present invention has respective conductive rubber clamp fixing claws on both said housing and said lid and a conductive rubber clamp fixing hub or nut that hooks said conductive rubber clamp fixing claw to said conductive rubber clamp; the size of said conductive rubber clamp fixing claw is smaller than the size of said conductive rubber clamp fixing hub or nut.

Another embodiment of the present invention is constructed such that said metal clip has a second fixing claw for fixing the stud bolt to the housing via the metal clip, said second fixing claw is a pair of second segments provided on the bottom of said metal clip, said pair of second segments are arranged orthogonally to said pair of first segments and, extending in an axial direction of the stud bolt so that tips approach each other, they press on the side of the stud bolt.

Another embodiment of the present invention is constructed such that said lid has a metal clip press plate and the tip of said metal clip press plate presses the bottom of said metal clip when said lid superposes said housing.

Another embodiment of the present invention may have conductive plastic as said conductive material.

Another embodiment of the present invention provides a method to manufacture said pipe mounting unit with grounding function and the characteristic of this method is the manufacture of said housing and said lid in a single mold.

In another embodiment of the present invention, the manufacturing method of the pipe mounting unit with grounding function is characterized in that said conductive material is conductive nylon and a thin sheet hinge is constructed with conductive nylon.

With the present invention, the tip of a current conducting plate touches the surface of a stud bolt forming an angle with respect to a radial direction of the stud bolt, because of which the contacting part of the current conducting plate and the surface of the stud bolt is linear. Also, since the leading end of the current conducting plate is arranged so as to extend beyond the threading of the stud bolt in an axial direction of the stud bolt, when the current conducting plate is inserted, it can be inserted at approximately a right angle to the spiral of the stud bolt's threading, and a current flow of the current conducting plate and the stud bolt can be ensured with only slight damage to the tip of the threading. Moreover, the part where the coating peels is totally in contact with the current conducting plate, and with hardly any exposure, is resistant to rust. Also, since the amount of coating that peels off affects the linear contact part only slightly, in comparison with the prior art, the amount of exposure ends up being significantly less. The threading of the stud bolt may also be constructed in a ring-like protrusion stripe.

Also, since a current path is formed between the pipe holding part in contact with the pipe and the current conducting plate of the metal clip that is fitted in the housing, there is a current flow between the pipe and the stud bolt, and static electricity generated in the pipe can escape to the vehicle body through the stud bolt.

Furthermore, with the present invention, the metal clip and the stud bolt threading that hooks with the metal clip is arranged in the inside space of the fixing part, that is to say, since the part that fixes the stud bolt to the pipe mounting unit has a housing covered with a lid, water and the like cannot contact this part, and it is rust resistant in comparison with the construction of prior art. Also, since the stud bolt and nuts are not exposed, there is no danger of harm to workers, users etc., from getting stuck by them.

BRIEF DESCRIPTION OF THE DRAWINGS

FIG. 1G is an oblique view of an enlargement of the circled part P of FIG. 1F.

FIG. 2 is an oblique view showing the closed position of the pipe mounting unit with grounding function of FIG. 1A.

In the following, a pipe mounting unit with grounding function according to a first embodiment of the present invention will be explained with reference to the drawings. First, the construction of the pipe mounting unit with grounding function 1 will be explained with reference mainly to FIGS. 1A to 1G, FIG. 2 and FIGS. 3A to 3F.

Figure 3A:
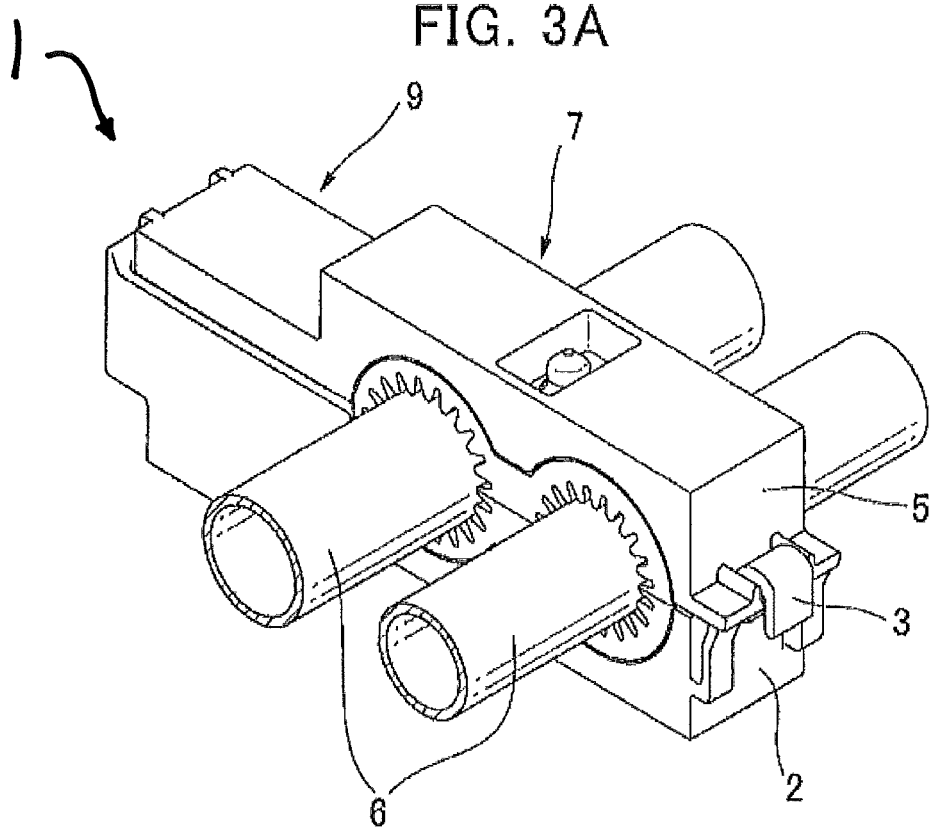
FIG. 3A is an oblique view showing pipes mounted in the pipe mounting unit with grounding function of FIG. 1A.
Figure 3B:
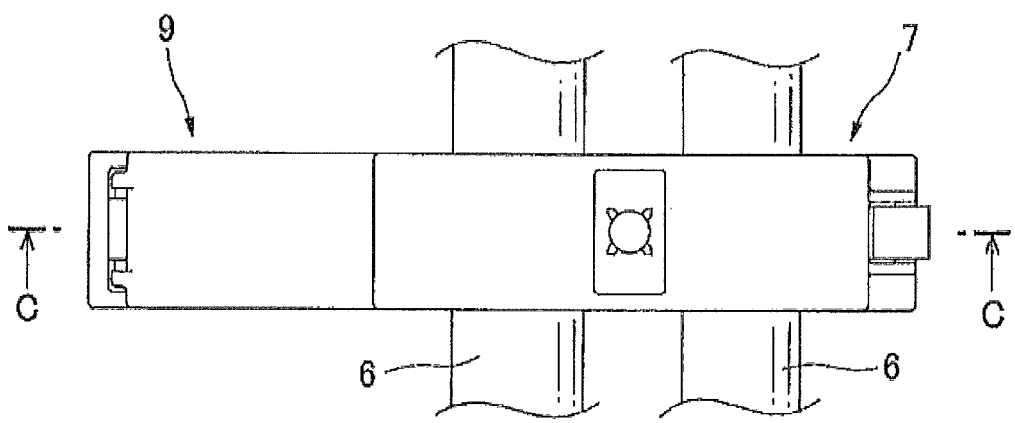
FIG. 3B is a top plan view of FIG. 3A.
Figure 3C:
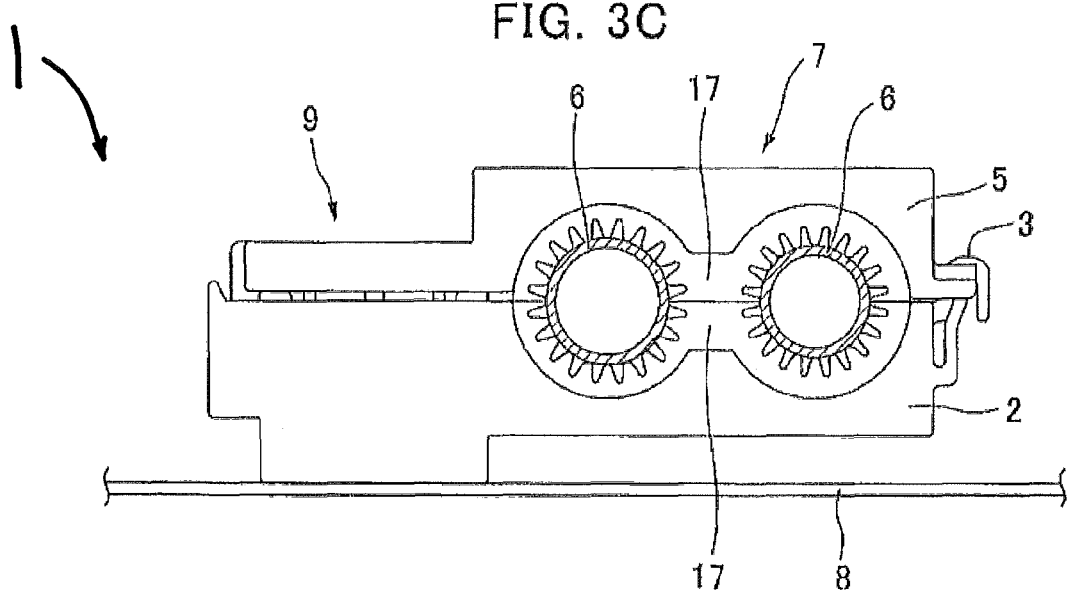
FIG. 3C is a front view of FIG. 3A.
Figure 3D:
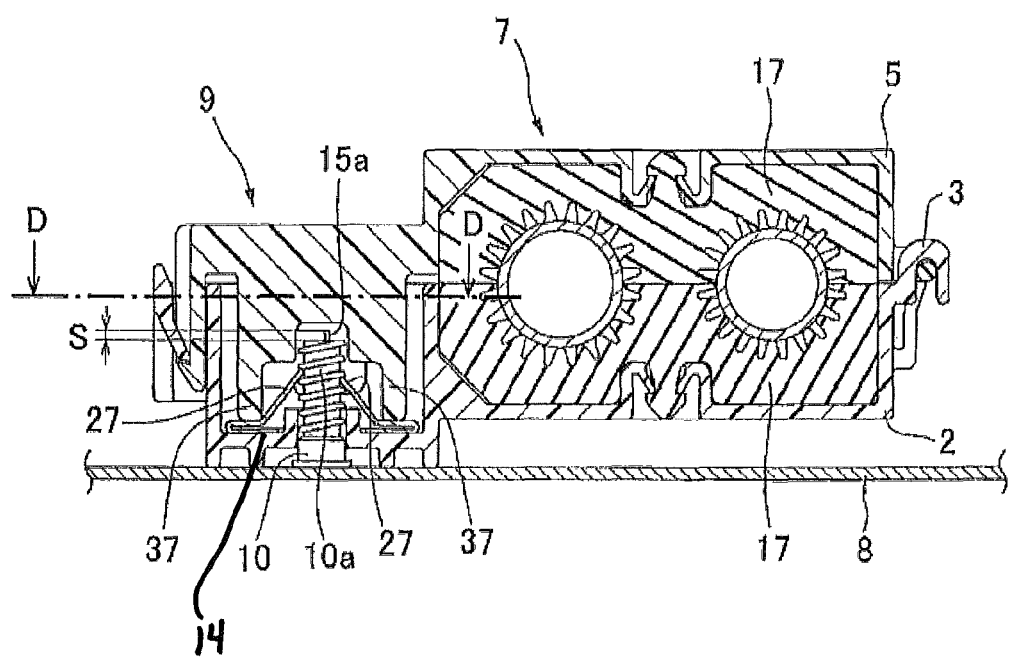
FIG. 3D is a C-C cross section of FIG. 3B.
Figure 3E:
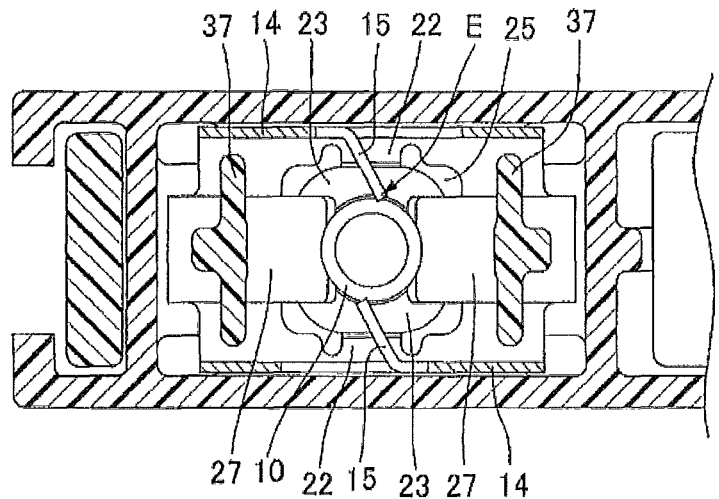
FIG. 3E is a D-D cross section of FIG. 3D.

As shown in FIGS. 1A to 1E and FIG. 2, the pipe mounting unit with grounding function 1 is equipped with a housing 2, and a lid 5 connected with a hinge 3 on one end of housing 2. As shown in FIG. 2 and FIGS. 3A to 3D, the construction forms a pipe holding element 7 that holds a pipe in contact with it by superposition of the lid 5 on the housing 2 with the hinge 3 as a fulcrum and a fixing element 9 that fixes this pipe holding element 7 to the body 8 of an automobile or other vehicle (FIGS. 3C and 3D).

Figure 1A:
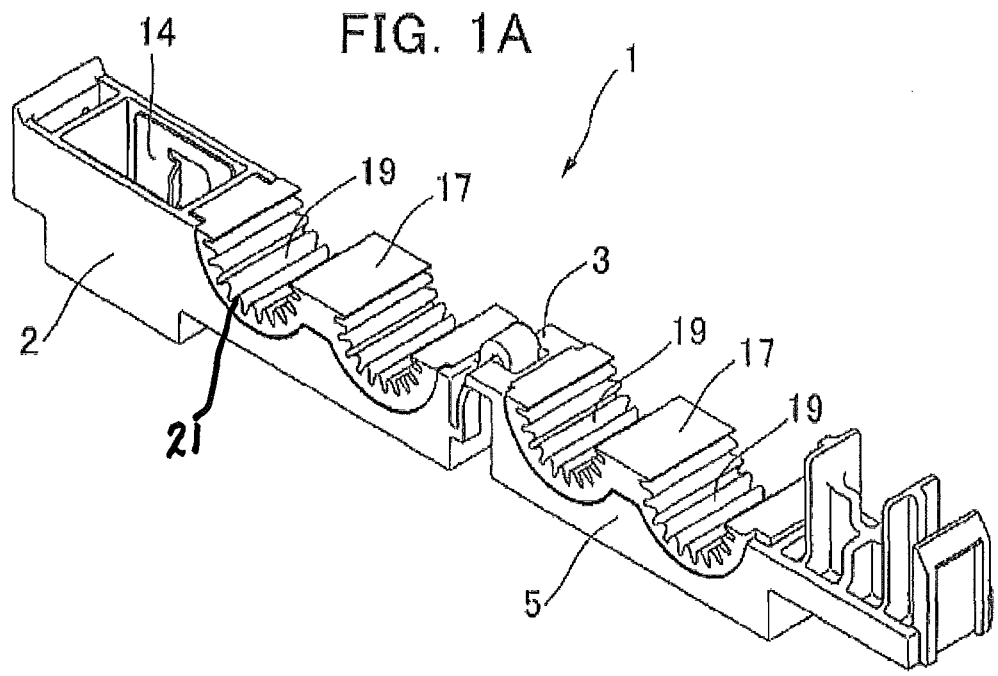
FIG. 1A is an oblique view showing the open position of the pipe mounting unit with grounding function in the first embodiment of the present invention.
Figure 1B:
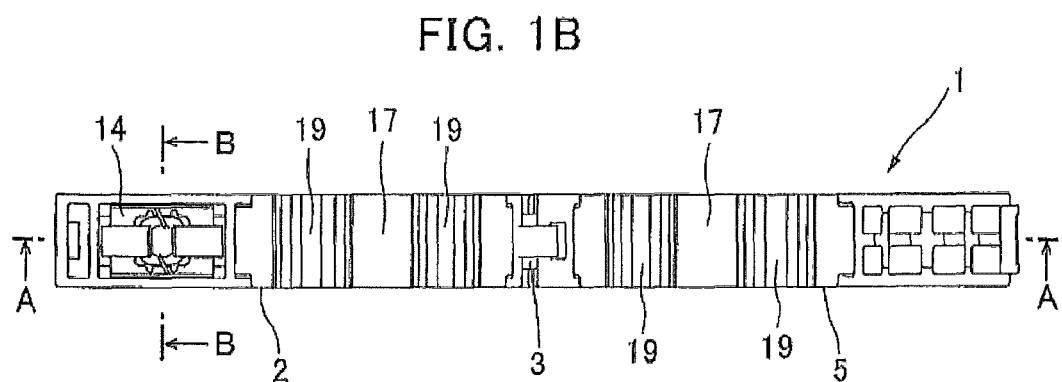
FIG. 1B is a top plan view of FIG. 1A.
Figure 1C:
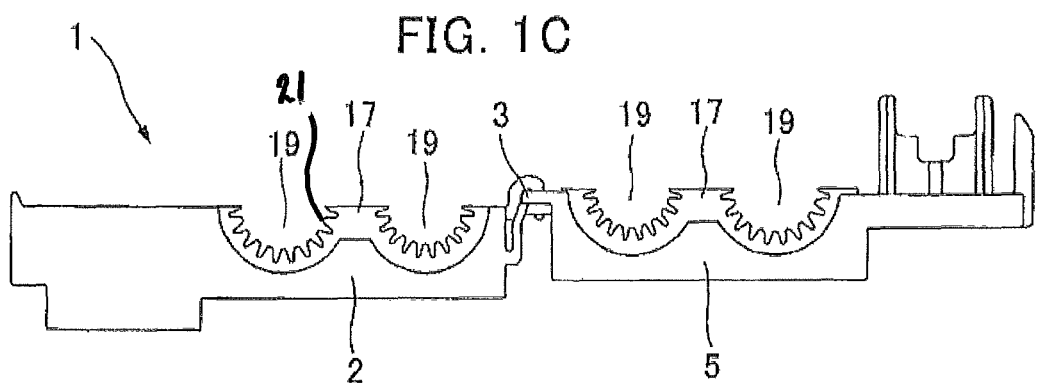
FIG. 1C is a front view of FIG. 1A.
Figure 1D:
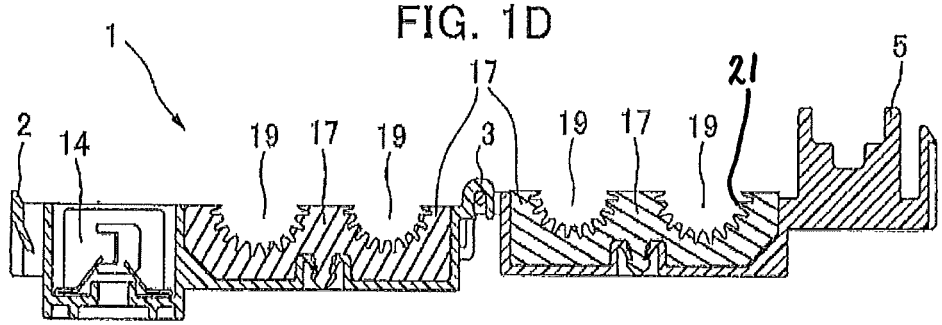
FIG. 1D is an A-A cross-section of FIG. 1B.
Figure 1E:
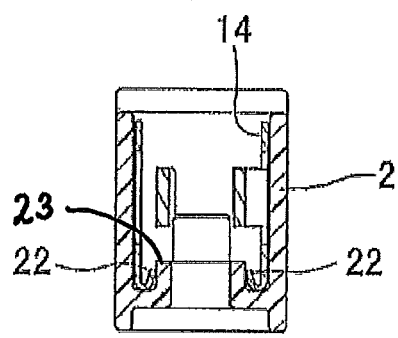
FIG. 1E is a B-B cross-section of FIG. 1B.
Figure 1F:
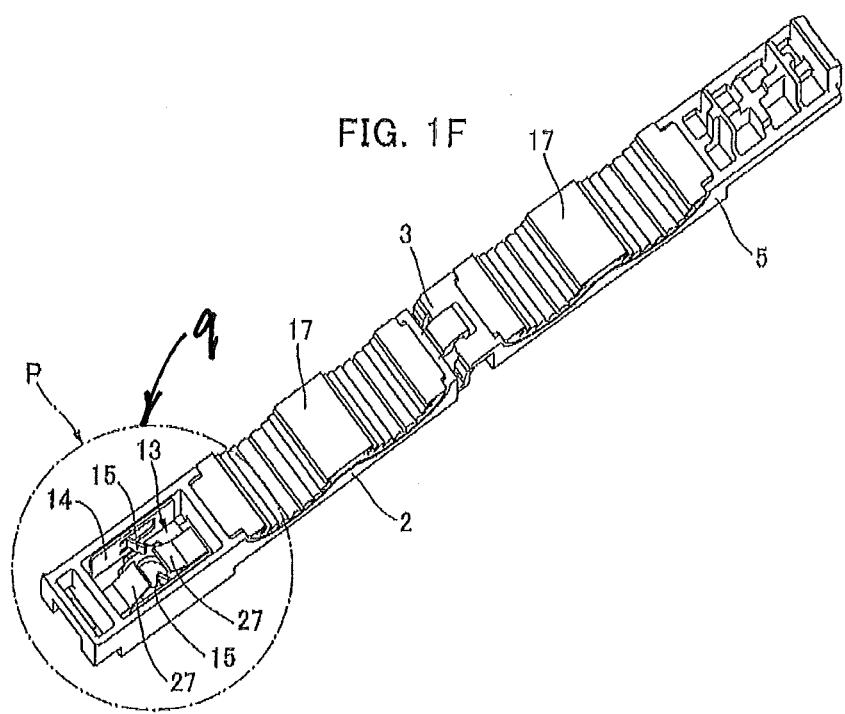
FIG. 1F is another oblique view of FIG. 1A shown at a different angle.

Referring to FIGS. 1F and 1G, in the interior of the fixing element 9, a space 13 is formed that receives the threading 10a of a stud bolt 10 that is fixed to the vehicle body 8 (FIG. 3D). The stud bolt 10 is fixed to the body panel of a vehicle body 8 by welding, etc. and a rustproof coating is applied on the whole surface of this.

A metal clip 14 (FIGS. 1G, 3D and 3E) that hooks with the stud bolt 10 is fitted into the space 13 in the housing 2.

Figure 3F:
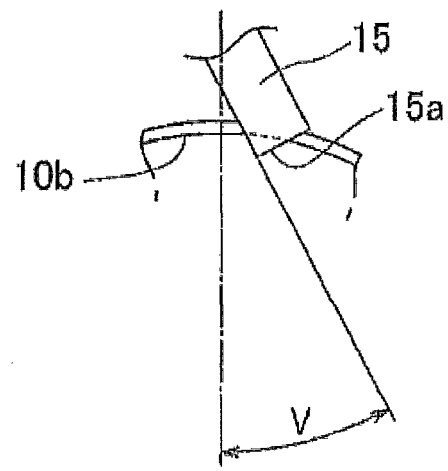
FIG. 3F is a detail of the E part of FIG. 3E

The metal clip 14 has a current conducting plate 15 that presses on the threading 10a of the stud bolt 10. The current conducting plate 15, as shown in FIG. 3F, has a leading end 15a, and this forms an angle V that is in a radial direction of the stud bolt 10 and slightly encroaches upon the surface 10b of the stud bolt. By this action, the edge of the plate thickness part of the leading end 15a of the current conducting plate 15 contacts the surface 10b of the stud bolt 10 and, when the bolt is inserted, the edge cuts into the tip of the threading, and the coating of the threading is peeled off.

The leading end 15a of the current conducting plate 15 is arranged such that it extends beyond the threading 10a of the stud bolt 10 in an axial direction of the stud bolt 10. That is, as shown in FIG. 3D, the leading end 15a of the current conducting plate 15 is arranged to have a surplus margin S in an axial direction towards the inserted stud bolt 10. By means of this, the peel-off coating part of the stud bolt 10 is linear and when the entire peel-off coating part of the stud bolt 10 in the inserted position contacts the current conducting plate 15, with hardly any exposure, it becomes rust resistant.

Figure 7A:
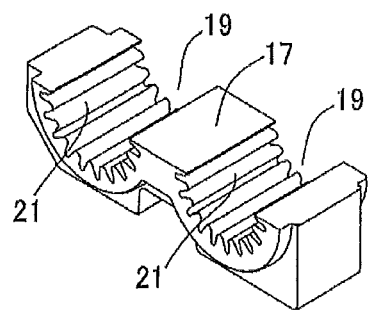
FIG. 7A is an oblique view of the conductive rubber clamp constituting one part of the pipe mounting unit with grounding function of FIG. 1A.
Figure 7B:
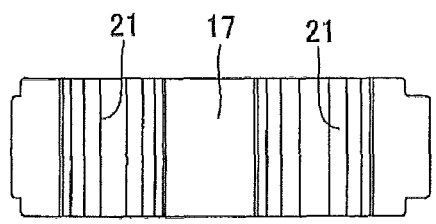
FIG. 7B is a top plan view of FIG. 7A
Figure 7C:
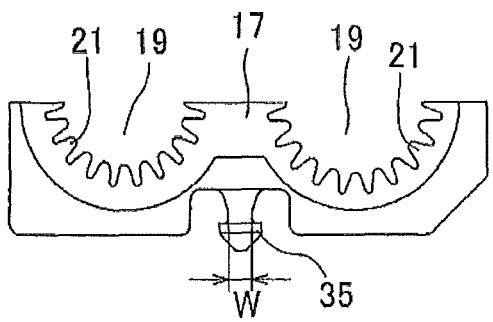
FIG. 7C is a front view of FIG. 7A
Figure 7D:
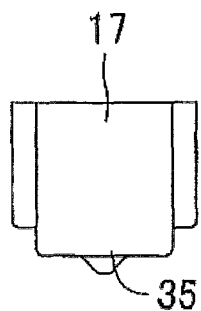
FIG. 7D is a right side view of FIG. 7C.
Figure 8A:
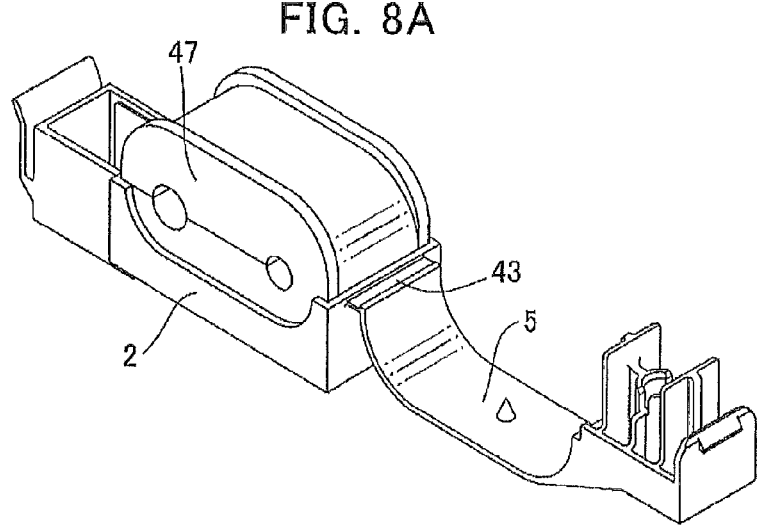
FIG. 8A is an oblique view showing the open position of the pipe mounting unit with grounding function in a second embodiment of the present invention.
Figure 8B:
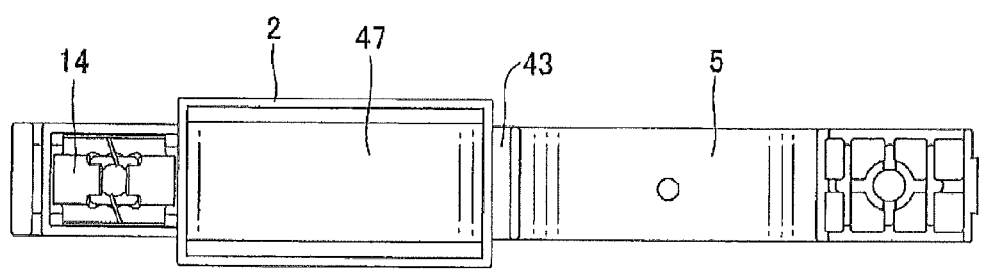
FIG. 8B is a top plan view of FIG. 8A.
Figure 8C:
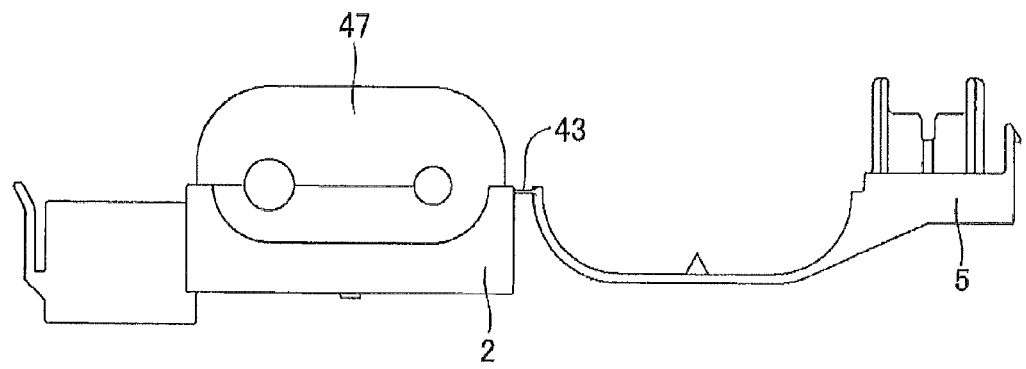
FIG. 8C is a front view of FIG. 8A.
Figure 8D:
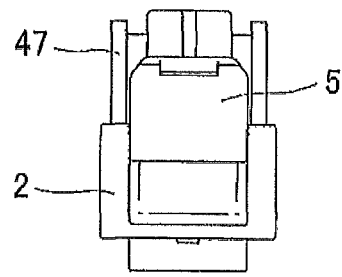
FIG. 8D is a right side view of FIG. 8C.
Figure 9A:
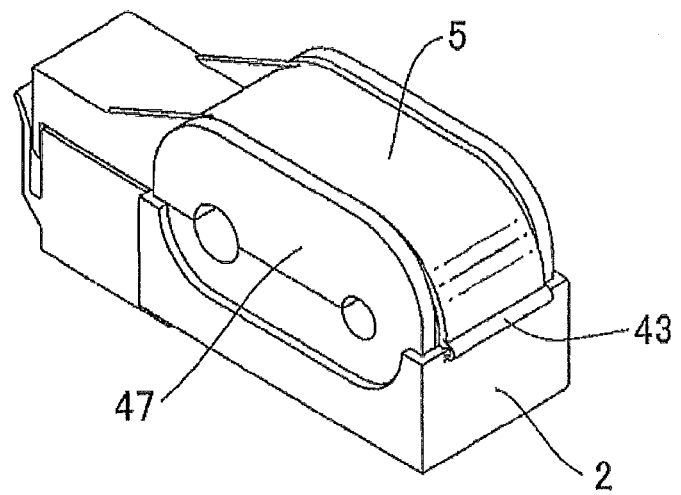
FIG. 9A is an oblique view showing the closed position of the pipe mounting unit with grounding function of FIG. 8A.
Figure 9B:
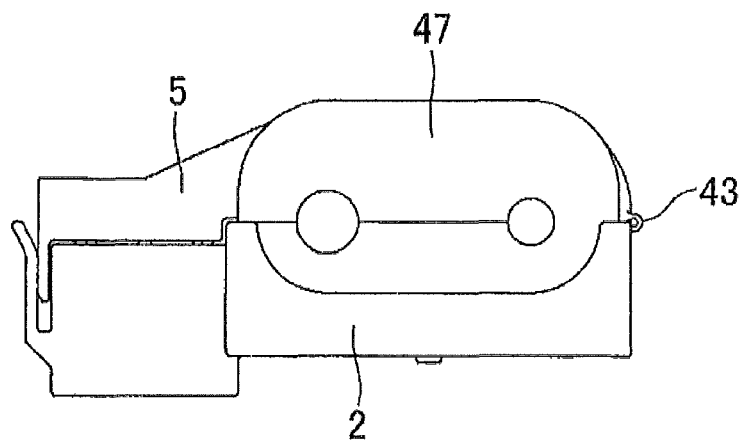
FIG. 9B is a front view of FIG. 9A.

As shown in FIGS. 1A-1D, 2 and 3C, for example, on the sides of the overlapping pair of the housing 2 and the lid 5, respective conductive rubber clamps 17 are placed; and on the opposing sides of the respective conductive rubber clamps 17, a depressed orbicular concave element 19 is furnished that can hold the pipe in contact with it when the housing is closed. Referring now to FIGS. 1A, 1C and 7A, respective anti-vibration folds 21 are formed on the inside wall surfaces of these concave elements 19 and, by this construction, an anti-vibration effect is imparted to the pipes 6 that the conductive rubber clamps 17 are holding in contact. The conductive rubber clamp 17 is made of conductive rubber.

Also, the housing 2 is made of conductive plastic. In this way, a conductive path is formed among the pipes, the conductive rubber clamps 17 holding the pipes 6, the housing 2 in which the conductive rubber clamps 17 are set, the metal clip 14 fitted into the housing, the current conducting plate 15 of the metal clip 14 and the stud bolt 10 fixed to the vehicle body 8.

Therefore, static electricity of the pipes 6 can escape to the vehicle body via this conductive path.

In this embodiment, the lid 5 particularly does not necessarily need to be made of conductive plastic but there is no problem in using conductive plastic in the situation of the above manufacture.

Next, the construction of the metal clip 14 will be described in more detail referring to FIGS. 4A to 4E. The metal clip 14 has a pair of first fixing claws 22 for fixing the metal clip to the housing 2. On the other hand, as shown in FIG. 5D, the housing 2 has a metal clip hooking element 23. The construction is such that the metal clip 14 is fitted in the housing 2 by the first fixing claw 22 hooking with the metal clip hooking element 23, as particularly shown in FIG. 1E.

Figure 4A:
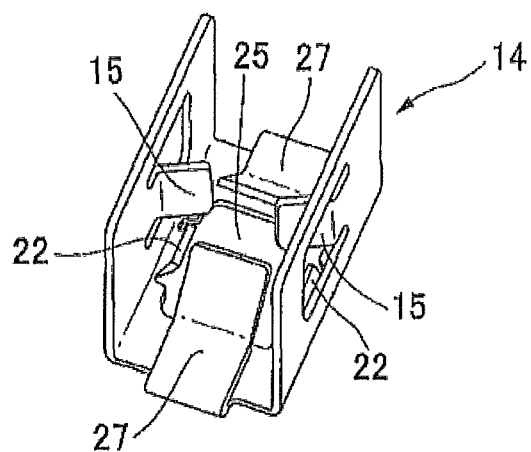
FIG. 4A is an oblique view of the metal clip constituting one part of the pipe mounting unit with grounding function of FIG. 1A.
Figure 4B:
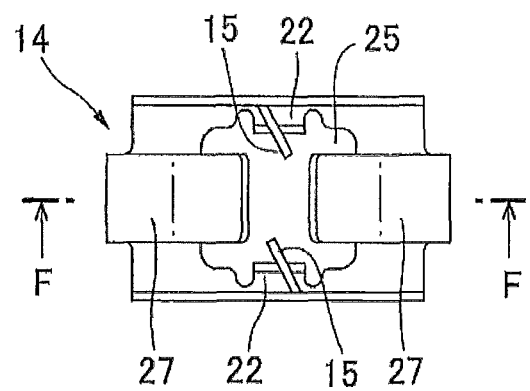
FIG. 4B is top plan view of FIG. 4A.
Figure 4C:
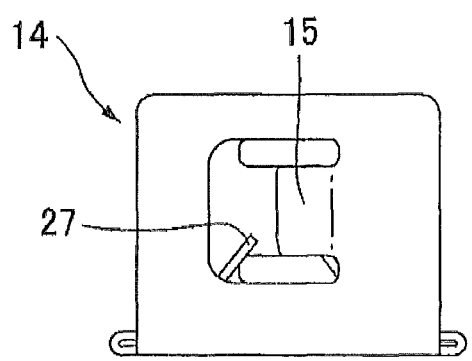
FIG. 4C is a front view of FIG. 4A.
Figure 4D:
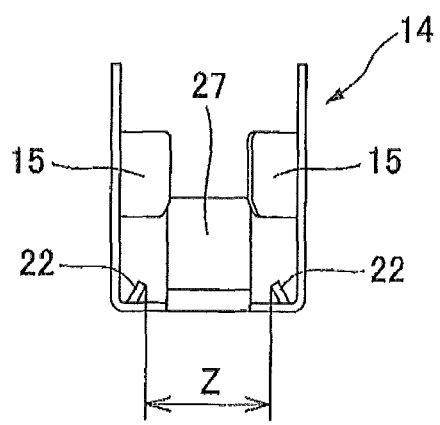
FIG. 4D is a right side view of FIG. 4C.
Figure 4E:
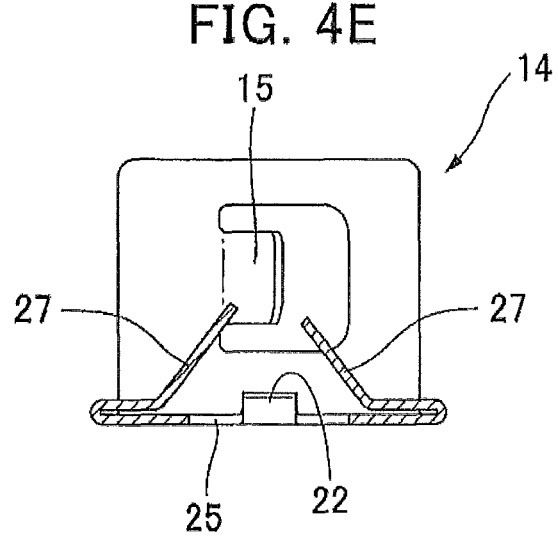
FIG. 4E is an F-F cross section of FIG. 4B.

The metal clip 14, as shown in FIG. 4A, includes a U-shaped metal plate that has a bottom surface and a pair of opposing sides. There is an aperture 25 in the bottom of the metal clip 14 that receives the metal clip hooking element 23 of the housing 2, and the first fixing claws 22 are on the edge of the aperture 25.

Figure 5A:
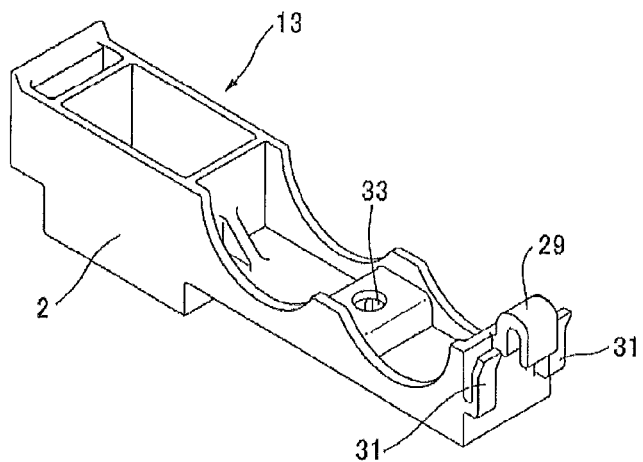
FIG. 5A is an oblique view of the housing constituting one part of the pipe mounting unit with grounding function of FIG. 1A.
Figure 5B:
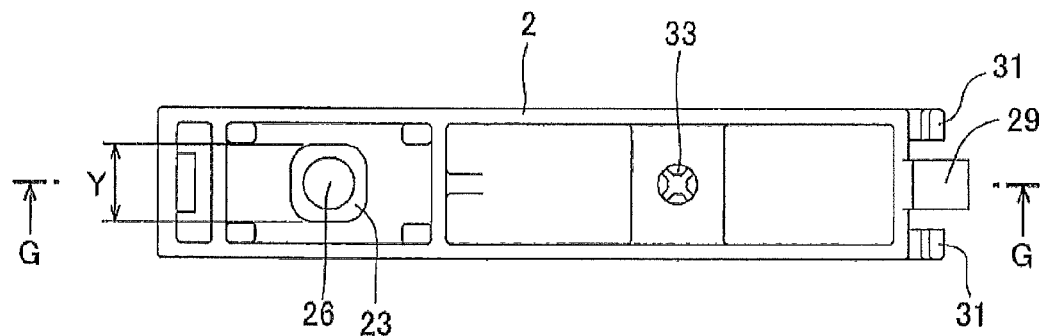
FIG. 5B is a top plan view of FIG. 5A.
Figure 5C:
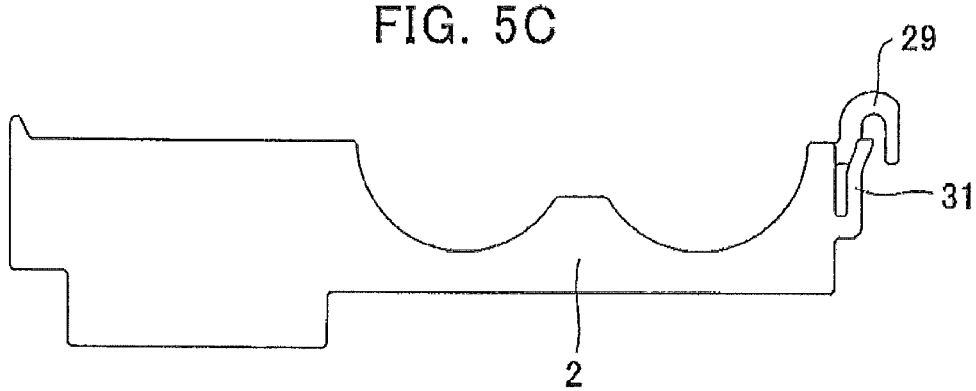
FIG. 5C is a front view of FIG. 5A.
Figure 5D:
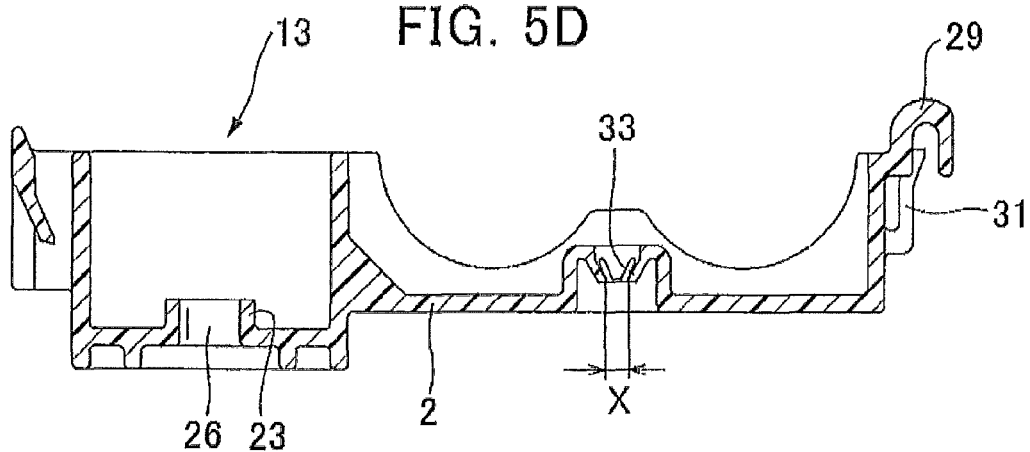
FIG. 5D is a G-G cross section of FIG. 5B.
Figure 5E:
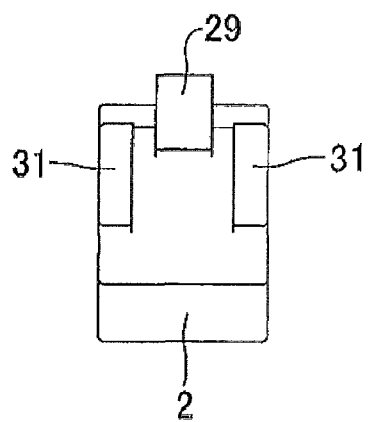
FIG. 5E is a right side view of FIG. 5C.
Figure 6A:
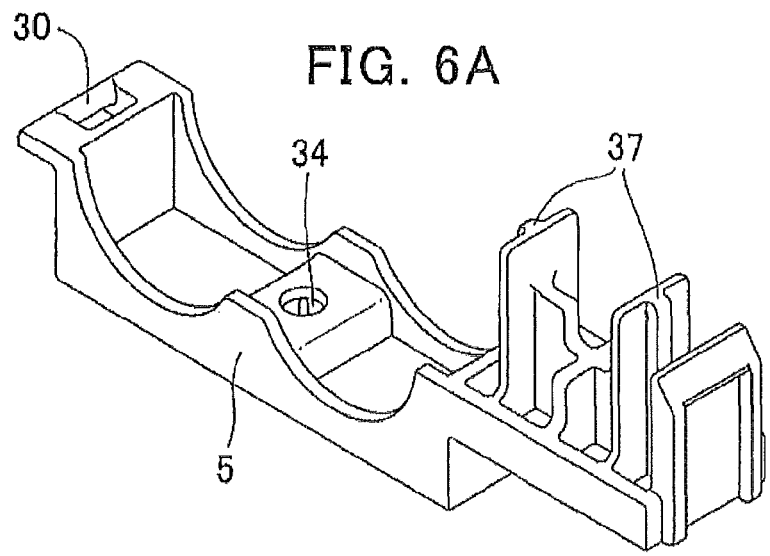
FIG. 6A is an oblique view of the lid constituting one part of the pipe mounting unit with grounding function of FIG. 1A.
Figure 6B:
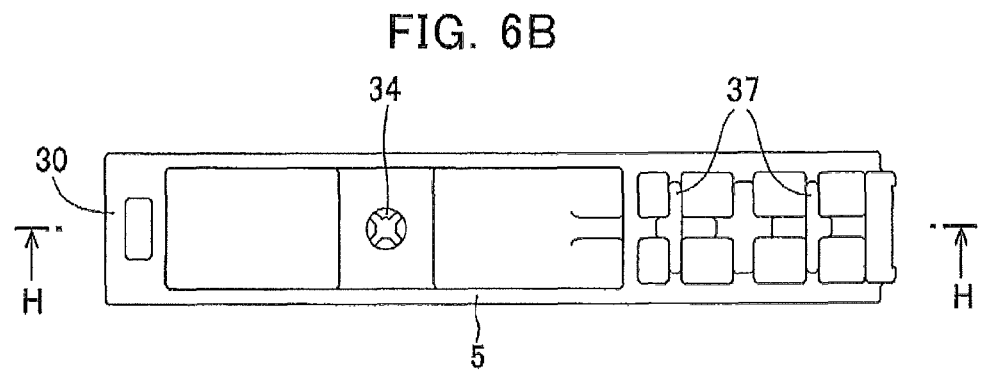
FIG. 6B is a top plan view of FIG. 6A.
Figure 6C:
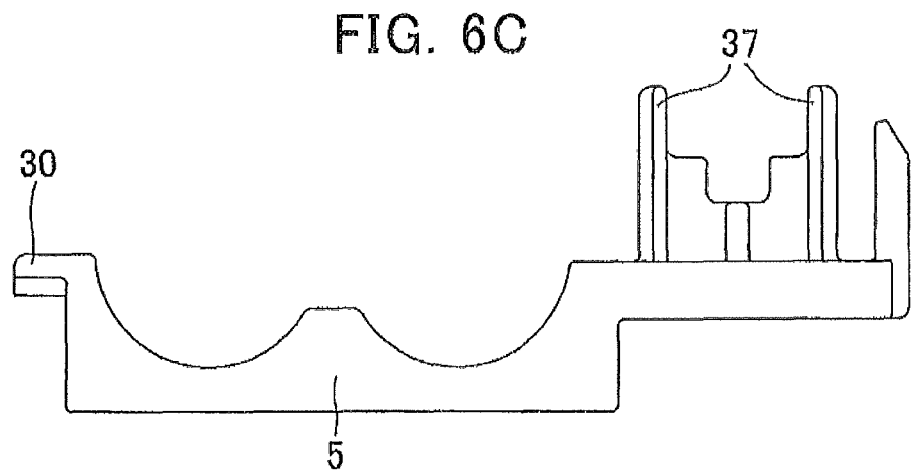
FIG. 6C is a front view of FIG. 6A
Figure 6D:
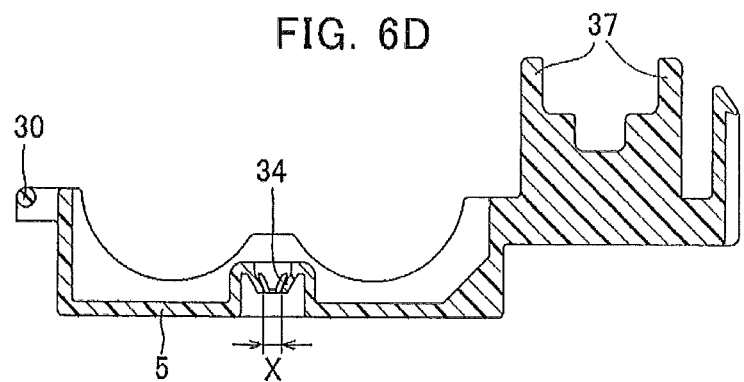
FIG. 6D is an H-H cross section of FIG. 6B.
Figure 6E:
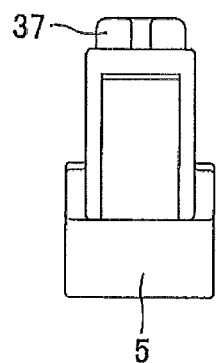
FIG. 6E is a right side view of FIG. 6C.

On the other hand, the metal clip hooking element 23 of the housing 2 is a protruding element formed on the bottom surface of the housing 2 that forms a space of the fixing element 13 (see FIG. 5D), the size Z between the first fixing claws 22 (see FIG. 4D) in relation to the size Y of the metal clip hooking element 23 (see FIG. 5B) is set at Z<Y. Thus, at the same time that the metal clip 14 is fixed to encroach on the housing 2, the contact of the metal clip with the housing 2 is made reliable. This ensures there is a current flowing between the housing 2 and the stud bolt 10 via the metal clip 14.

The current conducting plate 15 of the metal clip 14, as shown in FIG. 4A, includes a pair of first segments formed on one part of the opposite sides of the U-shaped metal plate. In another place, on the metal clip hooking element 23 of the housing, there is a stud bolt insertion hole 26 into which the stud bolt is inserted (see FIG. 5D). The end 15a of the current conducting plate 15 including the pair of first segments is constructed such that, extending inwards to a reciprocal approach, it presses with the threading 10a of the stud bolt 10 protruding from the aperture 25 and the stud bolt insertion hole 26 (see FIG. 3E), thus producing a direct metal-to-metal electrical connection with the stud bolt.

Furthermore, the metal clip 14 has a second fixing claw 27 to fix the stud bolt 10 to the housing 2 by means of the metal clip. The second fixing claw 27 includes a pair of second segments provided on the bottom of the metal clip 14. The second fixing claw 27 is arranged orthogonally with the current conducting plate 15 including the pair of first segments; its ends press on the side of the stud bolt 10 extending in an axial direction of the stud bolt 10 to be approaching each other (see FIG. 3E). Manufacture is completed by the fixing of the pipe mounting unit 1 onto the stud bolt 10 merely by pressing the pipe mounting unit 1 in the axial direction of the stud bolt 10.

The construction of the housing 2, lid 5 and conductive rubber clamp 17 will be described in more detail referring to FIGS. 5A to 5E, 6A to 6E and 7A to 7D.

As in the above, the housing 2 and the lid 5 are connected by a hinge 3. This hinge 3 includes a housing side hinge 29 provided on one end of the housing 2, a lid side hinge 30 provided on one end of the lid 5 and a lid-parting stop plate 31 adjacent the housing side hinge 29.

As was previously noted, on a part of the housing 2 distant from the housing side hinge 29 there is an element forming a space 13 of the fixing element 9 and a metal clip 14 is fitted into this space 13.

In the space 13, a metal clip hooking element 23 is provided that hooks with the metal clip 14, and there is a stud bolt insertion hole 26 into which the stud bolt 10 is inserted on the metal clip hooking element 23 (see FIG. 5D). Also, on a part of the housing 2 near the housing side hinge 29, there are 2 adjacent depressed orbicular concave elements forming the pipe holding element 7. A conductive rubber clamp fixing claw 33 is provided between these 2 concave elements.

On the other hand, as in the housing 2, a part of the lid 5 near the lid side hinge 30 is provided with 2 adjacent depressed orbicular concave elements forming the pipe holding element 7. A conductive rubber clamp fixing claw 34, similar to the conductive rubber clamp fixing claw 33, is provided between these 2 concave elements. A conductive clamp 17 is fitted in the pair of depressed orbicular concave elements of the housing 2 and the lid 5, as shown in FIGS. 7A to 7D. A concave element 19 of the above-mentioned conductive rubber clamp 17 is provided to conform to the position of the pair of concave elements of the housing 2 and the lid 5, and between these concave elements, there is a conductive rubber clamp fixing nut 35.

The sizes of the diameters X of the conductive rubber clamp fixing claws 33, 34 provided on the housing 2 and lid 5 is in a relationship to the size of the diameter of the conductive rubber clamp nut 35 of X<W. In this way, the contact of housing 2 and lid 5 with the conductive rubber clamp 17 is ensured at the same time as they are fixed by the conductive rubber clamp fixing claws 33, 34 encroaching on the conductive rubber clamp 17.

Further, on the lid 5, a metal clip press plate 37 is provided, as shown in FIGS. 6A-6E. When the lid 5 is superposed on the housing 2, this metal clip press plate 37 presses the bottom of the metal clip 14 fitted in the housing, particularly the base element of the second fixing claw 27 provided at its bottom surface (FIG. 3D). Thus, there is provided an opposition to the force that separates the joining of the metal clip 14 with the housing 2 when the stud bolt 10 is inserted.

Since the construction of the pipe mounting unit with grounding function 1 described above is an assembly type construction, a fixing construction of the first fixing claws 22 and the metal clip press plate 37, and the conductive clamp fixing claws 33, 34 is necessary to fix the metal clip 14 to the housing 2, but this is not necessary if it is constructed in an insert form or multicolored form or the like.

Next, the second embodiment of the pipe mounting unit of the present invention with grounding function will be described referring to FIGS. 8A to 8D and FIGS. 9A and 9B.

Since with many conductive plastics electrical resistance decreases, the hinge is produced from kneading carbon or metal powder, and there is a lot of breakage from bending. However, the hinge can be constructed in part with conductive nylon and the housing and lid can be made in one piece. Correspondingly, the construction shown in the figures has the housing and lid in one piece. What is different from the first embodiment in this construction is that the hinge 43 is made as a thin sheet hinge of conductive nylon. Also, with the construction of the conductive clamp 47, as shown in the figures, the pipe can be inserted in post-processing into a slit 45 into a mass of rubber, but a construction fixing to a housing and lid in two parts respectively is also possible.

By the construction of the pipe mounting unit with grounding function 1 described above, there are many grounding parts combined with an anti-vibration effect, so an anti-vibration effect was sought using a conductive rubber clamp; however, when an anti-vibration effect is not required, the conductive rubber clamp part is omitted, and the pipe fixing element can be equipped with conductive plastic or the like.

It will be appreciated by persons skilled in the art that the above embodiments have been described by way of example only, and not in any limitative sense, and that various alterations and modifications are possible without departure from the scope of the invention as defined by the appended claims.

What is claimed is:

1. A pipe mounting unit with grounding function, comprising:
a pipe holding section for holding a pipe, and a discrete metal clip fixed to a stud bolt that fixes the pipe holding section to a vehicle body;
said discrete metal clip includes a current conducting plate that presses on a threading part of the stud bolt;
said current conducting plate at its leading end forming an angle with respect to the radial direction of the stud bolt and contacting the surface of the stud bolt to peel off a portion of any coating that may be present on the stud bolt and thereby form a direct metal-to-metal connection with the stud bolt; such that
said discrete metal clip forming an electrical connection with the stud bolt; and
said pipe holding section is made of a conductive material by which a conduction path is formed between said pipe holding section and the current conducting plate of the metal clip; wherein
said discrete metal clip includes a U-shaped current conducting metal plate that has a base and a pair of facing sides, respective portions of said facing sides defining a pair of first segments having tips; the base of the metal clip defining an aperture into which the stud bolt is inserted so that it protrudes therefrom; and the tips of the pair of the first segments extend inwards to make contact and press on the threading of the stud bolt protruding from the aperture.

2. The pipe mounting unit with grounding function claimed in claim 1, further comprising:
a housing, and a lid connected by a hinge to one end of the housing;
said housing and said lid are constructed such that the pipe holding section and a fixing section fixing said pipe holding section to the vehicle body are formed by the respective superposition of the lid and housing, with said hinge as a fulcrum;
said fixing section defining a space which receives the threading of said stud bolt; and
said discrete metal clip is disposed in said space and joins the stud bolt to said housing.

3. A pipe mounting unit with grounding function, comprising:
a pipe holding section for holding a pipe, and a metal clip fixed to a stud bolt that fixes the pipe holding section to a vehicle body;
said metal clip includes a current conducting plate that presses on a threading part of the stud bolt;

said current conducting plate at its leading end forming an angle with respect to the radial direction of the stud bolt and contacting the surface of the stud bolt;

said pipe holding section is made of a conductive material by which a conduction path is formed between said pipe holding section and the current conducting plate of the metal clip; wherein said metal clip includes a U-shaped current conducting metal plate that has a base and a pair of facing sides, respective portions of said facing sides defining a pair of first segments having tips; the base of the metal clip defining an aperture into which the stud bolt is inserted so that it protrudes therefrom; and the tips of the pair of the first segments extend inwards to make contact and press on the threading of the stud bolt protruding from the aperture; and further comprising:

a housing, and a lid connected by a hinge to one end of the housing;

said housing and said lid are constructed such that the pipe holding section and a fixing section fixing said pipe holding section to the vehicle body are formed by the respective superposition of the lid and housing, with said hinge as a fulcrum;

said fixing section defining a space which receives the threading of said stud bolt;

said metal clip is disposed in said space and joins the stud bolt to said housing; and wherein said metal clip further includes a first fixing claw for fixing said metal clip to the housing;

said housing includes a metal clip hooking section; and said metal clip is fitted on said housing by hooking said first fixing claw with said metal clip hooking section.

4. The pipe mounting unit with grounding function claimed in claim 3, wherein:

the metal clip hooking section of said housing includes a protrusion formed on a bottom surface of said fixing section defining said space;

said protrusion defines a stud bolt insertion hole into which the stud bolt is inserted;

said aperture defines an edge; said first fixing claw is disposed on the edge of said aperture; and said protrusion hooks with the first fixing claw by insertion of said protrusion into said aperture.

5. The pipe mounting unit with grounding function claimed in claim 4, wherein:

respective concavities with holding function are formed in both sides of said lids and said housing; and wherein respective conductive rubber clamps are disposed in said concavities; such that during superposition of the opposing sides of the respective concavities, respective conductive rubber clamps make contact with the pipe.

6. The pipe mounting unit with grounding function claimed in claim 5, wherein: respective conductive rubber clamp fixing claws are disposed on both sides of said housing and said lid; respective conductive rubber clamps include clamp fixing nuts that hook with said conductive rubber clamp fixing claws during superposition of said lid and said housing; and the size of said conductive rubber clamp fixing claws is made smaller than the size of said conductive rubber clamp fixing nuts.

7. The pipe mounting unit with grounding function claimed in claim 6, wherein:

said metal clip includes a second fixing claw for fixing the stud bolt to the housing via the metal clip;

said second fixing claw includes a pair of second segments provided on the bottom of said metal clip;

said pair of second segments are disposed orthogonally to said pair of first segments;

said stud bolt defines sides; and tips of the second segments press on the sides of the stud bolt extending in an axial direction of the stud bolt, so that the tips of the second segment approach each other.

8. The pipe mounting unit with grounding function claimed in claim 7, wherein:

said metal clip includes a bottom;

said lid includes a metal clip press plate having a tip; and the metal clip press plate is constructed so that its tip presses the bottom of said metal clip when said lid superposes the housing.

9. The pipe mounting unit with grounding function claimed in claim 8, wherein said conductive material is conductive plastic.

10. The pipe mounting unit with grounding function claimed in claim 3, wherein:

said conductive material is conductive nylon; and wherein the hinge is defined by a thin sheet formed of conductive nylon.

* * * * *